US011924047B2

(12) United States Patent
Zaringhalam et al.

(10) Patent No.: US 11,924,047 B2
(45) Date of Patent: Mar. 5, 2024

(54) SYSTEM AND METHOD FOR DECLARATIVE AUTOMATION FOR DEPLOYMENT OF A SOFTWARE-DEFINED NETWORK (SDN)

(71) Applicant: JPMorgan Chase Bank, N.A., New York, NY (US)

(72) Inventors: Ali Zaringhalam, North Caldwell, NJ (US); Nickolas Vela, Tukwila, WA (US); Sujana Bhumireddy, Morganville, NJ (US); Ariel Liguori, Capital Federal (AR); Matias Alvarez, Capital Federal (AR)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/659,970

(22) Filed: Apr. 20, 2022

(65) Prior Publication Data

US 2023/0344723 A1 Oct. 26, 2023

(51) Int. Cl.
*H04L 41/122* (2022.01)
*H04L 41/0806* (2022.01)
*H04L 41/5041* (2022.01)

(52) U.S. Cl.
CPC ........ *H04L 41/122* (2022.05); *H04L 41/0806* (2013.01); *H04L 41/5041* (2013.01)

(58) Field of Classification Search
CPC .......... H04L 41/0806; H04L 41/5041
See application file for complete search history.

(56) References Cited

U.S. PATENT DOCUMENTS

| | | | | |
|---|---|---|---|---|
| 2009/0113407 | A1* | 4/2009 | Sedukhin | G06F 8/10 |
| | | | | 717/168 |
| 2016/0210578 | A1* | 7/2016 | Raleigh | G06Q 30/0284 |
| 2020/0296029 | A1* | 9/2020 | Shenoy | H04L 41/12 |
| 2020/0344147 | A1* | 10/2020 | Pianigiani | H04L 12/4633 |
| 2021/0258281 | A1* | 8/2021 | Balamurugan | H04L 41/5019 |
| 2021/0281553 | A1* | 9/2021 | Ward | G06F 21/53 |

* cited by examiner

*Primary Examiner* — Viet D Vu (74) *Attorney, Agent, or Firm* — GREENBLUM & BERNSTEIN, P.L.C.

(57) ABSTRACT

Various methods, apparatuses/systems, and media for automatically deploying an SDN are disclosed. A processor implements a declarative model for an SDN deployment and receives, in the declarative model, service order data from a user corresponding to the SDN deployment. The service order data includes high-level declarative statement data specifying a desired end-state of the SDN deployment. The processor translates the high-level declarative statement data into a low-level specification data that includes data corresponding to a topology and how the SDN should be deployed; creates a run-time topology model based on the low-level specification data; determines whether the service order is valid or not by comparing the low-level specification data against predefined policies and infrastructure constraints data corresponding to execution of the SDN deployment; and automatically executes deployment of the SDN based on a determination that the service order is valid in response to the run-time topology model.

17 Claims, 6 Drawing Sheets

SYSTEM AND METHOD FOR DECLARATIVE AUTOMATION FOR DEPLOYMENT OF A SOFTWARE-DEFINED NETWORK (SDN)

TECHNICAL FIELD

This disclosure generally relates to software-defined network (SDN), and, more particularly, to methods and apparatuses for implementing a platform and language agnostic intent-based declarative automation module for automatically deploying an SDN.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

An SDN typically provides exploitation and dimension for network operator the easiness of shield. SDNs are often based on providing an application programmable interface for forwarding devices, for example switches or routers enabling programmability of these forwarding devices and therefore the entire network.

Moreover, large-scale deployment of compute and networking infrastructure for an Integrated Compute Platform (ICP) Wholesale (ICPW) may require automation of work flows. Typically, an ICPSDN automation set is responsible for the networking component of an ICPW infrastructure. The ICPSDN infrastructure may be required to support multiple tenants (i.e. subscribers). Once deployed on Day 1, the infrastructure requires frequent updates to add new tenants or expand networking resources for existing tenants on Day 2. A method is needed to track the current state of the deployment and to implement incremental changes. The method may be required to ensure that the changes are valid and consistent with a set of business rules and policies adopted by ICPSDN. In addition, the method may be required to lend itself to operational procedures that can be easily adopted by the engineering staff responsible for provisioning SDN networking resources.

For automation purposes, conventional tools typically differentiate between initial deployment (Day 1) and subsequent updates (Day 2) and may use different methods for each. For example, conventional tools utilize manual configuration and imperative models where a user may be required to know in detail the sequence of commands and their dependency thereby increasing complexity and time in deployment and delivery of the SDN and tends to be error prone. Conventional tools also require external programming to implement policy and infrastructure constraints. In addition, for validation purposes, they typically require a persistent form of storage (file or DB) to maintain the state of the deployment thereby further increasing complexity and time in deployment and delivery of the SDN.

Thus, there is a need for an advanced automation tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic intent-based declarative automation module for automatically deploying an SDN thereby significantly reducing infrastructure complexity and time in deployment and delivery of the SDN compared to conventional tools, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform and language agnostic intent-based declarative automation module that may be configured to view the deployment as the source of data and uses discovery to capture the current state of the deployment for validation purposes thereby integrating initial deployment and lifecycle management in a single solution platform, but the disclosure is not limited thereto.

For example, according to an aspect of the present disclosure, the platform and language agnostic intent-based declarative automation module may be configured to design and implement a declarative model for ICPSDN tenant deployment. The SDN implementation may be in the vMware NSX-T supporting networking services to complement ICPW virtualized compute and storage services. Exemplary tenants may include private cloud application platform, Kubernetes platform, database management system (i.e., Cassandra), etc., but the disclosure is not limited thereto.

According to a further aspect of the present disclosure, the intent-based declarative automation module may be configured to create a declarative model in which the user (i.e., a build team) specifies any desired end-state of the deployment in a high-level specification and the automation module interprets and executes the intent in a manner consistent with defined business policies and infrastructure constraints. This approach is in contrast with the conventional imperative model where the user must specify the steps to achieve the desired end-state (i.e., the user must know the commands to execute each step as well as the dependencies between the steps).

According to an aspect of the present disclosure, a method for automatically deploying an SDN by utilizing one or more processors and one or more memories is disclosed. The method may include: implementing a declarative model for an SDN deployment; receiving, in the declarative model, service order data from a user corresponding to the SDN deployment, wherein the service order data may include high-level declarative statement data specifying a desired end-state of the SDN deployment; translating the high-level declarative statement data into a low-level specification data that includes data corresponding to a topology and how the SDN should be deployed; creating a run-time topology model based on the low-level specification data; determining whether the service order is valid or not by comparing the low-level specification data against predefined policies and infrastructure constraints data corresponding to execution of the SDN deployment; and automatically executing deployment of the SDN based on a determination that the service order is valid in response to the run-time topology model.

According to an additional aspect of the present disclosure, the method may further include: automatically transmitting an electronic notification to a computing device utilized by the user that the SDN deployment is successful.

According to a further aspect of the present disclosure, in determining whether the service order is valid or not, the method may further include: generating a difference data based on comparing the low-level specification data against predefined policies and infrastructure constraints data; determining that the difference data is less than a predetermined threshold value; and determining that the service order is valid.

According to a yet another aspect of the present disclosure, in determining whether the service order is valid or not, the method may further include: generating a difference data based on comparing the low-level specification data against predefined policies and infrastructure constraints data; determining that the difference data is equal to or more than a predetermined threshold value; and determining that the service order is invalid.

According to an aspect of the instant disclosure, the method may further include: automatically rejecting deployment of the SDN based on a determination that the service order is invalid; and automatically transmitting an electronic notification to a computing device utilized by the user that the SDN deployment is rejected.

According to a further aspect of the instant disclosure, the high-level declarative statement data may not include data related to details network configurations for services corresponding to the SDN deployment, and the low-level specification data may include data related to details network configurations for services corresponding to the SDN deployment, but the disclosure is not limited thereto.

According to an additional aspect of the instant disclosure, the service order data may include one or more of the following data: data related to a list of network subscribers; data related to a list of subnetworks assigned to each network subscriber; and data related to rules and constrains in sharing gateway for networking, but the disclosure is not limited thereto.

According to another aspect of the instant disclosure, a system for automatically deploying an SDN is disclosed. The system may include: a processor; and a memory operatively connected to the processor via a communication interface, the memory storing computer readable instructions, when executed, may cause the processor to: implement a declarative model for an SDN deployment; receive, in the declarative model, service order data from a user corresponding to the SDN deployment, wherein the service order data includes high-level declarative statement data specifying a desired end-state of the SDN deployment; translate the high-level declarative statement data into a low-level specification data that includes data corresponding to a topology and how the SDN should be deployed; create a run-time topology model based on the low-level specification data; determine whether the service order is valid or not by comparing the low-level specification data against predefined policies and infrastructure constraints data corresponding to execution of the SDN deployment; and automatically execute deployment of the SDN based on a determination that the service order is valid in response to the run-time topology model.

According to an aspect of the instant disclosure, the processor may be further configured to: automatically transmit an electronic notification to a computing device utilized by the user that the SDN deployment is successful.

According to a further aspect of the instant disclosure, in determining whether the service order is valid or not, the processor may be further configured to: generate a difference data based on comparing the low-level specification data against predefined policies and infrastructure constraints data; determine that the difference data is less than a predetermined threshold value; and determine that the service order is valid.

According to an additional aspect of the instant disclosure, in determining whether the service order is valid or not, the processor may be further configured to: generate a difference data based on comparing the low-level specification data against predefined policies and infrastructure constraints data; determine that the difference data is equal to or more than a predetermined threshold value; and determine that the service order is invalid.

According to yet another aspect of the instant disclosure, the processor may be further configured to: automatically reject deployment of the SDN based on a determination that the service order is invalid; and automatically transmit an electronic notification to a computing device utilized by the user that the SDN deployment is rejected.

According to a further aspect of the present disclosure, a non-transitory computer readable medium configured to store instructions for automatically deploying an SDN is disclosed. The instructions, when executed, may cause a processor to perform the following: implementing a declarative model for an SDN deployment; receiving, in the declarative model, service order data from a user corresponding to the SDN deployment, wherein the service order data may include high-level declarative statement data specifying a desired end-state of the SDN deployment; translating the high-level declarative statement data into a low-level specification data that includes data corresponding to a topology and how the SDN should be deployed; creating a run-time topology model based on the low-level specification data; determining whether the service order is valid or not by comparing the low-level specification data against predefined policies and infrastructure constraints data corresponding to execution of the SDN deployment; and automatically executing deployment of the SDN based on a determination that the service order is valid in response to the run-time topology model.

According to an additional aspect of the present disclosure, the instructions, when executed, may cause the processor to further perform the following: automatically transmitting an electronic notification to a computing device utilized by the user that the SDN deployment is successful.

According to a further aspect of the present disclosure, in determining whether the service order is valid or not, the instructions, when executed, may cause the processor to further perform the following: generating a difference data based on comparing the low-level specification data against predefined policies and infrastructure constraints data; determining that the difference data is less than a predetermined threshold value; and determining that the service order is valid.

According to a yet another aspect of the present disclosure, in determining whether the service order is valid or not, the instructions, when executed, may cause the processor to further perform the following: generating a difference data based on comparing the low-level specification data against predefined policies and infrastructure constraints data; determining that the difference data is equal to or more than a predetermined threshold value; and determining that the service order is invalid.

According to an aspect of the instant disclosure, the instructions, when executed, may cause the processor to further perform the following: automatically rejecting deployment of the SDN based on a determination that the service order is invalid; and automatically transmitting an electronic notification to a computing device utilized by the user that the SDN deployment is rejected.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
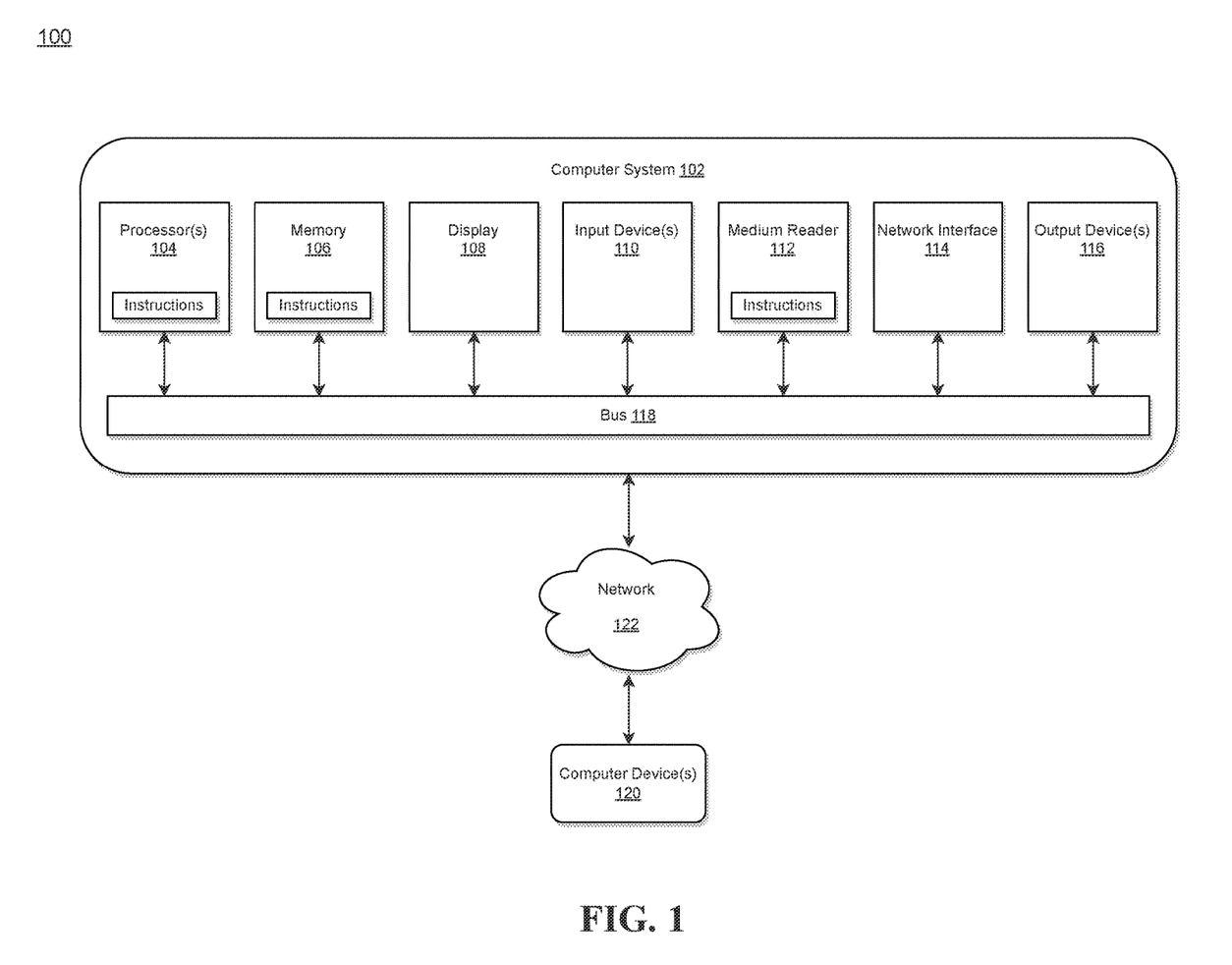
FIG. 1 illustrates a computer system for implementing a platform and language agnostic intent-based declarative automation module for automatically deploying an SDN in accordance with an exemplary embodiment.

FIG. 1 is an exemplary system for use in implementing a platform and language agnostic intent-based declarative automation module for automatically deploying an SDN in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
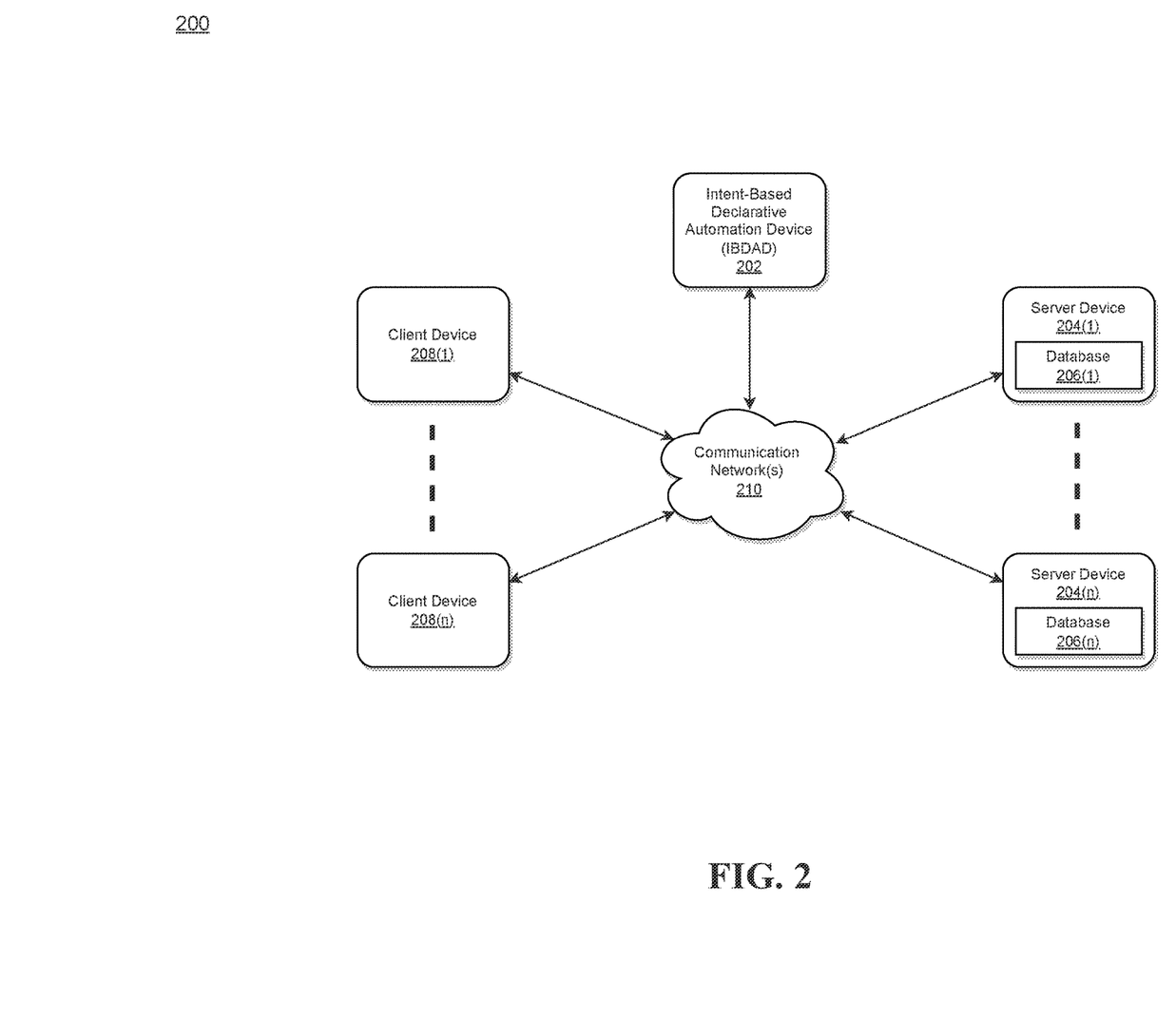
FIG. 2 illustrates an exemplary diagram of a network environment with a platform and language agnostic intent-based declarative automation device in accordance with an exemplary embodiment.

Referring to FIG. 2, a schematic of an exemplary network environment 200 for implementing a platform and language agnostic intent-based declarative automation device (IBDAD) of the instant disclosure is illustrated.

According to exemplary embodiments, the above-described problems associated with conventional tools may be overcome by implementing a IBDAD 202 as illustrated in FIG. 2 that may implement a platform and language agnostic intent-based declarative automation module for automatically deploying an SDN thereby significantly reducing infrastructure complexity and time in deployment and delivery of the SDN compared to conventional tools, but the disclosure is not limited thereto. For example, the present disclosure, through one or more of its various aspects, embodiments, and/or specific features or sub-components, provides, among other features, various systems, servers, devices, methods, media, programs, and platforms for implementing that IBDAD 202 as illustrated in FIG. 2 that may implement a platform and language agnostic intent-based declarative automation module that may be configured to view the deployment as the source of data and uses discovery to capture the current state of the deployment for validation purposes thereby integrating initial deployment and lifecycle management in a single solution platform, but the disclosure is not limited thereto.

The IBDAD 202 may be the same or similar to the computer system 102 as described with respect to FIG. 1.

The IBDAD 202 may store one or more applications that can include executable instructions that, when executed by the IBDAD 202, cause the IBDAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IBDAD 202 itself, may be located in virtual server(s) running in a cloud-based computing environment rather than being tied to one or more specific physical network computing devices. Also, the application(s) may be running in one or more virtual machines (VMs) executing on the IBDAD 202. Additionally, in one or more embodiments of this technology, virtual machine(s) running on the IBDAD 202 may be managed or supervised by a hypervisor.

In the network environment 200 of FIG. 2, the IBDAD 202 is coupled to a plurality of server devices 204(1)-204(n) that hosts a plurality of databases 206(1)-206(n), and also to a plurality of client devices 208(1)-208(n) via communication network(s) 210. A communication interface of the IBDAD 202, such as the network interface 114 of the computer system 102 of FIG. 1, operatively couples and communicates between the IBDAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IBDAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IBDAD 202 may be a standalone device or integrated with one or more other devices or apparatuses, such as one or more of the server devices 204(1)-204(n), for example. In one particular example, the IBDAD 202 may be hosted by one of the server devices 204(1)-204(n), and other arrangements are also possible. Moreover, one or more of the devices of the IBDAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IBDAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the IBDAD 202 as illustrated in FIG. 2 that may implement a platform and language agnostic intent-based declarative automation module for automatically deploying an SDN thereby significantly reducing infrastructure complexity and time in deployment and delivery of the SDN compared to conventional tools, but the disclosure is not limited thereto. For example, according to exemplary embodiments, the client devices 208(1)-208(n) in this example may include any type of computing device that can facilitate the implementation of the IBDAD 202 as illustrated in FIG. 2 that IBDAD 202 that may implement a platform and language agnostic intent-based declarative automation module that may be configured to view the deployment as the source of data and uses discovery to capture the current state of the deployment for validation purposes thereby integrating initial deployment and lifecycle management in a single solution platform, but the disclosure is not limited thereto.

The client devices 208(1)-208(n) may run interface applications, such as standard web browsers or standalone client applications, which may provide an interface to communicate with the IBDAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the IBDAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IBDAD 202, the server devices 204(1)-204(n), or the client devices 208(1)-208(n), for example, may be configured to operate as virtual instances on the same physical machine. For example, one or more of the IBDAD 202, the server devices 204(1)-204(n), or the client devices 208(1)-208(n) may operate on the same physical device rather than as separate devices communicating through communication network(s) 210. Additionally, there may be more or fewer IBDADs 202, server devices 204(1)-204(n), or client devices 208(1)-208(n) than illustrated in FIG. 2. According to exemplary embodiments, the IBDAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
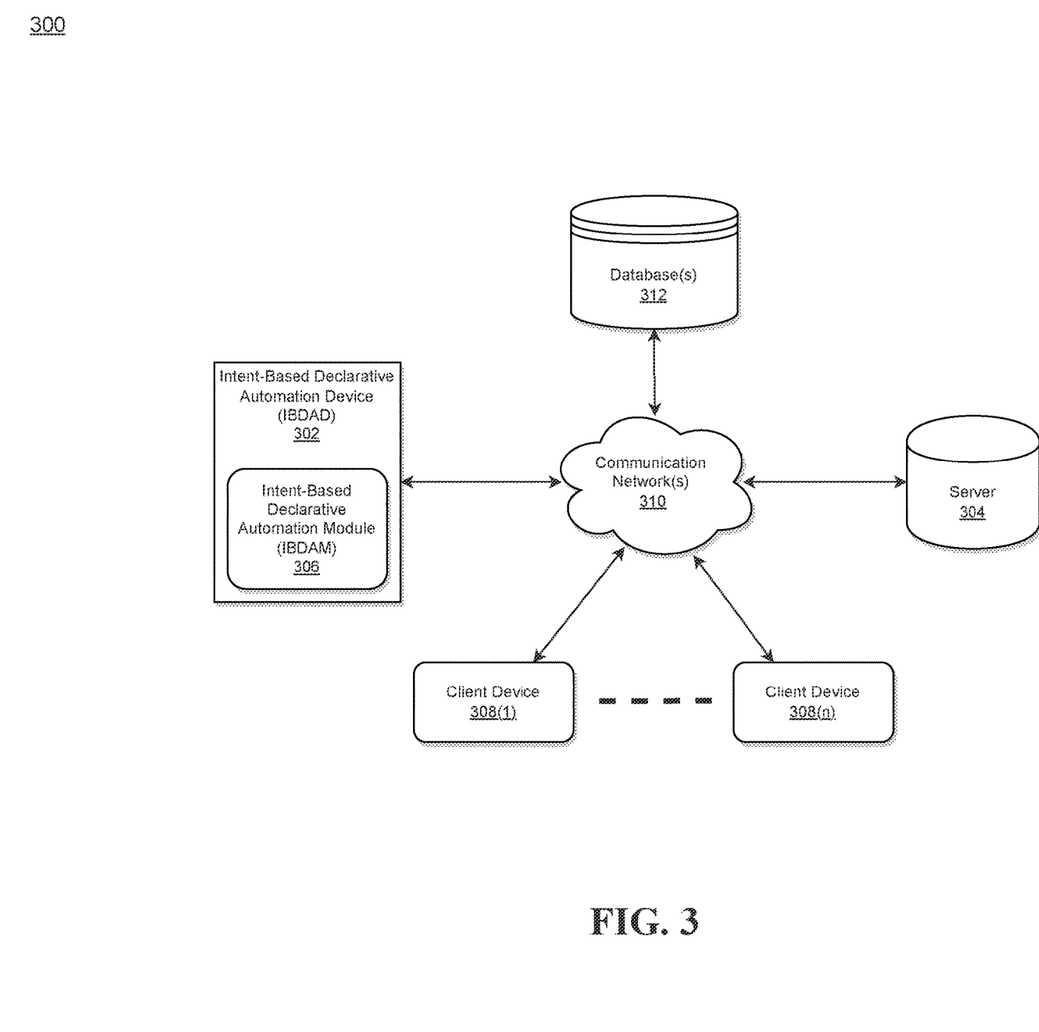
FIG. 3 illustrates a system diagram for implementing a platform and language agnostic intent-based declarative automation device having a platform and language agnostic intent-based declarative automation module in accordance with an exemplary embodiment.

FIG. 3 illustrates a system diagram for implementing a platform and language agnostic IBDAD having a platform and language agnostic intent-based declarative automation module (IBDAM) in accordance with an exemplary embodiment.

As illustrated in FIG. 3, the system 300 may include an IBDAD 302 within which an IBDAM 306 is embedded, a server 304, a database(s) 312, a plurality of client devices 308(1) . . . 308(n), and a communication network 310. The database(s) 312 may be also referred to as a configuration and log database.

According to exemplary embodiments, the IBDAD 302 including the IBDAM 306 may be connected to the server 304, and the database(s) 312 via the communication network 310. The IBDAD 302 may also be connected to the plurality of client devices 308(1) . . . 308(n) via the communication network 310, but the disclosure is not limited thereto. The client devices 308(1) . . . 308(n) may be the same or similar to the client devices 208(1) . . . 208(n)

According to exemplary embodiment, the IBDAD 302 is described and shown in FIG. 3 as including the IBDAM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the IBDAM 306 may be configured to receive real-time feed of data from the plurality of client devices 308(1) . . . 308(n) via the communication network 310.

As will be described below, the IBDAM 306 may be configured implement a declarative model for an SDN deployment; receive, in the declarative model, service order data from a user corresponding to the SDN deployment, wherein the service order data includes high-level declarative statement data specifying a desired end-state of the SDN deployment; translate the high-level declarative statement data into a low-level specification data that includes data corresponding to a topology and how the SDN should be deployed; create a run-time topology model based on the low-level specification data; determine whether the service order is valid or not by comparing the low-level specification data against predefined policies and infrastructure constraints data corresponding to execution of the SDN deployment; and automatically execute deployment of the SDN based on a determination that the service order is valid in response to the run-time topology model, but the disclosure is not limited thereto.

The plurality of client devices 308(1) . . . 308(n) are illustrated as being in communication with the IBDAD 302. In this regard, the plurality of client devices 308(1) . . .

308(n) may be "clients" of the IBDAD 302 and are described herein as such. Nevertheless, it is to be known and understood that the plurality of client devices 308(1) . . . 308(n) need not necessarily be "clients" of the IBDAD 302, or any entity described in association therewith herein. Any additional or alternative relationship may exist between either or both of the plurality of client devices 308(1) . . . 308(n) and the IBDAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the IBDAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The IBDAD 302 may be the same or similar to the IBDAD 202 as described with respect to FIG. 2, including any features or combination of features described with respect thereto.

Figure 4:
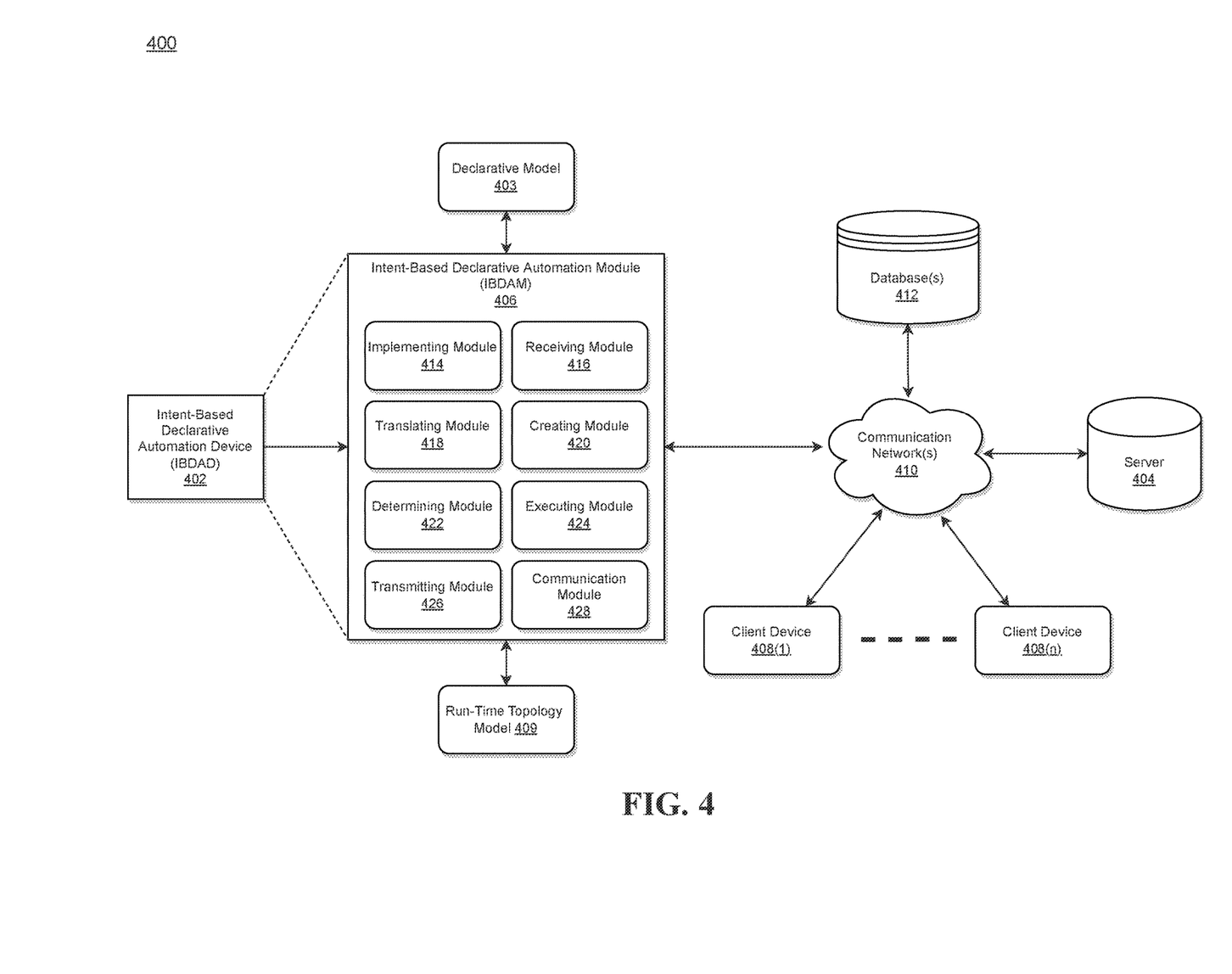
FIG. 4 illustrates a system diagram for implementing a platform and language agnostic intent-based declarative automation module of FIG. 3 in accordance with an exemplary embodiment.

FIG. 4 illustrates a system diagram for implementing a platform and language agnostic IBDAM of FIG. 3 in accordance with an exemplary embodiment.

According to exemplary embodiments, the system 400 may include a platform and language agnostic IBDAD 402 within which an IBDAM 406 is embedded, a server 404, database(s) 412, and a communication network 410.

According to exemplary embodiments, the IBDAD 402 including the IBDAM 406 may be connected to the server 404 and the database(s) 412 via the communication network 410. The IBDAD 402 may also be connected to the plurality of client devices 408(1)-408(n) via the communication network 410, but the disclosure is not limited thereto. The IBDAM 406, the server 404, the plurality of client devices 408(1)-408(n), the database(s) 412, the communication network 410 as illustrated in FIG. 4 may be the same or similar to the IBDAM 306, the server 304, the plurality of client devices 308(1)-308(n), the database(s) 312, the communication network 310, respectively, as illustrated in FIG. 3.

According to exemplary embodiments, as illustrated in FIG. 4, the IBDAM 406 may include an implementing module 414, a receiving module 416, a translating module 418, a creating module 420, a determining module 422, an executing module 424, a transmitting module 426, and a communication module 428.

According to exemplary embodiments, each of the implementing module 414, receiving module 416, translating module 418, creating module 420, determining module 422, executing module 424, transmitting module 426, and the communication module 428 of the IBDAM 406 as illustrated in FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, receiving module 416, translating module 418, creating module 420, determining module 422, executing module 424, transmitting module 426, and the communication module 428 of the IBDAM 406 as illustrated in FIG. 4 may be implemented by microprocessors or similar, and may be programmed using software (e.g., microcode) to perform various functions discussed herein and may optionally be driven by firmware and/or software.

Alternatively, according to exemplary embodiments, each of implementing module 414, receiving module 416, translating module 418, creating module 420, determining module 422, executing module 424, transmitting module 426, and the communication module 428 of the IBDAM 406 as illustrated in FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the implementing module 414, receiving module 416, translating module 418, creating module 420, determining module 422, executing module 424, transmitting module 426, and the communication module 428 of the IBDAM 406 as illustrated in FIG. 4 may be called via corresponding API.

The process may be executed via the communication module 428 and the communication network 410, which may comprise plural networks as described above. For example, in an exemplary embodiment, the various components of the IBDAM 406 may communicate with the server 404, and the database(s) 412 via the communication module 428 and the communication network 410. Of course, these embodiments are merely exemplary and are not limiting or exhaustive.

According to exemplary embodiments, the communication network 410 and the communication module 428 may be configured to establish a link between the database(s) 412, the client devices 408(1)-408(n) and the IBDAM 406.

As illustrated in FIG. 4, the IBDAM 406 may be configured to design and implement a declarative model 403 for ICPSDN tenant deployment. The SDN implementation may be in the vMware NSX-T supporting networking services to complement ICPW virtualized compute and storage services. Exemplary tenants may include private cloud application platform, Kubernetes platform, database management system (i.e., Cassandra), etc., but the disclosure is not limited thereto.

According to exemplary embodiments, the IBDAM 406 may be configured to create the declarative model 406 in which the user (i.e., a build team) specifies any desired end-state of the deployment in a high-level specification and the automation module interprets and executes the intent in a manner consistent with defined business policies and infrastructure constraints. This approach is in contrast with the conventional imperative model where the user must specify the steps to achieve the desired end-state (i.e., the user must know the commands to execute each step as well as the dependencies between the steps).

According to exemplary embodiments, the implementing module 414 may be configured to implement the declarative model 403 for an SDN deployment. The receiving module 416 may be configured to receive, in the declarative model 403, service order data from a user corresponding to the SDN deployment. The service order data includes high-level declarative statement data specifying a desired end-state of the SDN deployment.

According to exemplary embodiments, the translating module 418 may be configured to translate the high-level declarative statement data into a low-level specification data that includes data corresponding to a topology and how the SDN should be deployed.

According to exemplary embodiments, the high-level declarative statement data may not include data related to details network configurations for services corresponding to the SDN deployment, and the low-level specification data may include data related to details network configurations for services corresponding to the SDN deployment, but the disclosure is not limited thereto.

According to exemplary embodiments, the service order data may include one or more of the following data: data related to a list of network subscribers; data related to a list of subnetworks assigned to each network subscriber; and data related to rules and constrains in sharing gateway for networking, but the disclosure is not limited thereto.

According to exemplary embodiments, the creating module 420 may be configured to create a run-time topology model 409 based on the low-level specification data. The determining module 422 may be configured to determine whether the service order is valid or not by comparing the low-level specification data against predefined policies and infrastructure constraints data corresponding to execution of the SDN deployment.

According to exemplary embodiments, the executing module 424 may be configured to automatically execute deployment of the SDN based on a determination that the service order is valid in response to the run-time topology model.

According to exemplary embodiments, the transmitting module 426 may be automatically transmit an electronic notification to a computing device (i.e., client device 408) utilized by the user that the SDN deployment is successful.

According to exemplary embodiments, in determining whether the service order is valid or not, the IBDAM 406 may generate a difference data based on comparing the low-level specification data against predefined policies and infrastructure constraints data; determine that the difference data is less than a predetermined threshold value; and determine that the service order is valid.

According to exemplary embodiments, in determining whether the service order is valid or not, the IBDAM 406 may generate a difference data based on comparing the low-level specification data against predefined policies and infrastructure constraints data; determine, by utilizing the determining module 422, that the difference data is equal to or more than a predetermined threshold value; and determine, by utilizing the determining module 422, that the service order is invalid.

According to exemplary embodiments, the IBDAM 406 may automatically reject deployment of the SDN based on a determination, by utilizing the determining module 422, that the service order is invalid; and automatically transmit, by utilizing the transmitting module 426, an electronic notification to the computing device (i.e., client device 408) utilized by the user that the SDN deployment is rejected.

Figure 5:
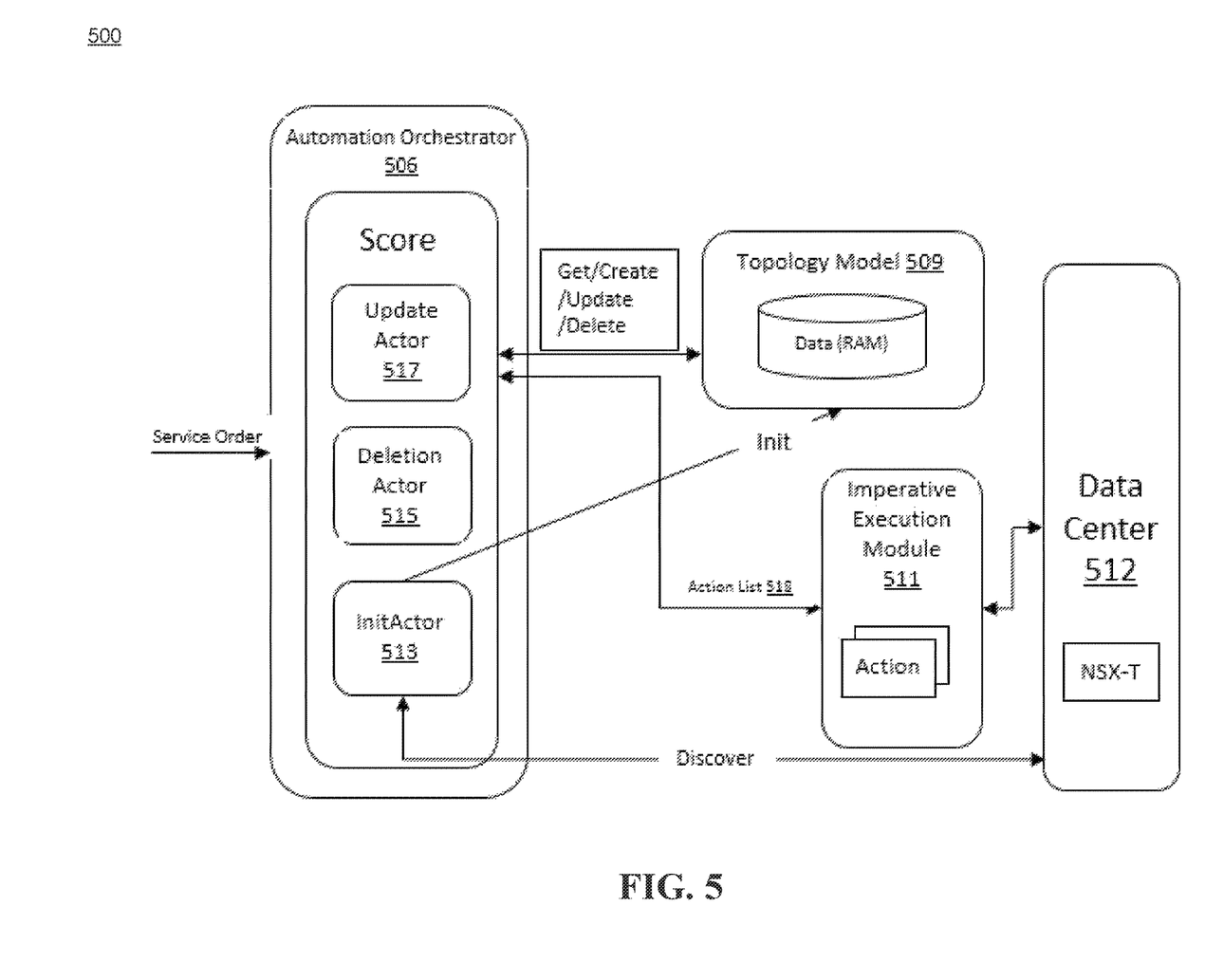
FIG. 5 illustrates an exemplary architecture implemented by the platform and language agnostic intent-based declarative automation module of FIG. 4 in accordance with an exemplary embodiment.

FIG. 5 illustrates an exemplary architecture 500 implemented by the IBDAM 406 of FIG. 4 in accordance with an exemplary embodiment. According to an exemplary embodiment, as illustrated in FIG. 5, the service order may be inputted to an automation orchestrator 506 (i.e., similar or same as the IBDAM 406 as illustrated in FIG. 4). The automation orchestrator 506 may include corresponding modules to validate and execute the service order. The automation orchestrator 506 may be bi-directionally communicate with a topology model 509 and an imperative execution module 511 (i.e., similar or same as the executing module 424 as illustrated in FIG. 4) to exchange data related to SDN deployment. The imperative execution module 511 and the automation orchestrator 506 may also bi-directionally communicate with a data center 512 that provides an agile software-defined infrastructure to build cloud-native application environments (i.e., vMware NSX-T).

As illustrated in FIG. 5, the automation orchestrator 506, for each deployment type (e.g., ICPW_GEN), may maintain a list of actors. The list may be referred to as "score". According to exemplary embodiments, the score may be comprised of the following actors: an InitActor 513 that may initialize the run-time topology model 509 from the NSX-T deployment; a DeletionActor 515 that may be responsible for validating deletions and compiling a list of deletion actions; and an UpdateActor 517 that may be responsible for validating updates (including creation) and compiling a list of update Actions (i.e., Action List 518).

According to exemplary embodiments, if the service order is valid, the deletion and update lists are sequentially executed in the imperative execution module 511 to implement the service order in NSX-T.

According to exemplary embodiments, the automation orchestrator 506 or the IBDAM 406 may implement topology model metadata that encapsulates policy rules. This metadata may be utilized in conjunction with the topology model 509 to validate and execute the service order.

According to exemplary embodiments, the IBDAM 406 may compare the intent update from the service order with the current state of the deployment. For example, the IBDAM 406 may delete items from the deployment that are no longer in the intent. The IBDAM 406 may create items not currently in the deployment. The IBDAM 406 may also implement any required updates to existing deployment.

According to exemplary embodiments, high-level external service description captured by the IBDAM 406 in the service order may be translated by the translating module 418 into a low-level internal description suitable for execution. For ensuring the automation by the IBDAM 406, the following requirements are met by the IBDAM 406: validation of intent against policies and infrastructure constraints; intent-driven execution to reach the desired end-state; idempotent execution (i.e., in repeated execution, no action is taken if the desired state exists) and atomic execution (i.e., the entire service order must be validated before individual valid pieces are executed).

According to exemplary embodiments, two types and tenants may be supported, but the disclosure is not limited thereto. One type may include private cloud application platform (which is a self-service tenancy where the private cloud application platform tenant may manage its own networking resources). Another type may include ICPW_GEN where ICPSDN is responsible for managing the networking resources. According to exemplary embodiments, a run-time data model of the deployment (referred to as the topology model 509 as illustrated in FIG. 5) may be required.

According to exemplary embodiments, the models for ICPW_GEN may include a tenant table that may include tenant name, network pattern, seal Id, and tier. Defined fields are used by associated objects (i.e., tenant name, network pattern, seal Id, and tier) and operations may include get, create, delete and patch, but the disclosure is not limited thereto.

According to exemplary embodiments, the models for ICPW_GEN and private cloud application platform deployments may also include a segment table that may include network, tenant name, seal Id, display name, prefix, network type, port count, T1 gateway name and tag list, and operations may include get, create, delete and patch, but the disclosure is not limited thereto. All tags associated with the tenant will be applied (i.e., tenant-name, network-pattern, seal-Id, tier). Derived tags may include network-type; optional tags (tag list can be empty) may include line of business for a particular region (e.g., country). According to exemplary embodiments, tags will be applied by detecting intent in the service order.

According to exemplary embodiments, the models for ICPW_GEN may include a T1 gateway table that may include gateway T1 name, seal-Id, tenant name and gateway T0 name. The models for ICPW_GEN may include a T0 gateway table that may include gateway T0 name, seal-Id, network pattern, tenant list, and edge capacity. The models for ICPW_GEN may include a prefix table that may include prefix, tenant name, gateway T0 name.

According to exemplary embodiments, the models for ICPW_GEN may also include the topology model metadata described above that encapsulates policy rules. This metadata is utilized in conjunction with the topology model 509 to validate and execute the service order.

According to exemplary embodiments, the models for private cloud application platform deployments may include a tenant table that may include tenant name, network pattern, seal Id, and tier. Defined fields are used by associated objects (i.e., tenant name, network pattern, seal Id, and tier) and operations may include get, create, delete and patch, but the disclosure is not limited thereto.

According to exemplary embodiments, the models for private cloud application platform deployments may also include T0 gateway table that may include gateway T0 name, seal-Id, network pattern, tenant list, and edge capacity, but the disclosure is not limited thereto.

According to exemplary embodiments, the models for private cloud application platform deployments may include a prefix table that may include prefix, tenant name, and gateway T0 name.

According to exemplary embodiments, the models for private cloud application platform deployments may include an edge cluster table that may include node name, cluster name, Id, and tenant name. According to exemplary embodiments, the cluster node is not the same as object Id because the object is created via a management API. Name is used as object handle to get the object Id. Id is assigned only when the object is created in NSX-T. Id is not used in the topology model and can be initialized to an Id at record creation. According to exemplary embodiments, the models for private cloud application platform deployments may also include an edge node table that may include a node name, Id, location and cluster name for giving a name for free nodes. A topology model metadata for the private cloud application platform may be utilized in conjunction with the topology model 509 to validate and execute the service order.

According to exemplary embodiments, the IBDAM 406 may also implement a CI/CD (continuous integration continuous delivery) model. For example, in order to provide control over the deployment state, the IBDAM 406 may utilize a source control model and execution using CI/CD pipeline. The service order is maintained as a file in a BitBucket (i.e., database 412) under source control. Each deployment has its own branch. In order to update the deployment by the IBDAM 406, an update to the service order file is required. This update requires the user to create a Pull Request (PR) in the deployment branch. In order to implement the PR change, the change is validated by the IBDAM 406 against the existing deployment. For example, if the change is valid, the PR is approved and merged to the deployment branch in the BitBucket. This merge may trigger the CI/CD pipeline to execute the service order change in the NSX-T deployment.

Figure 6:
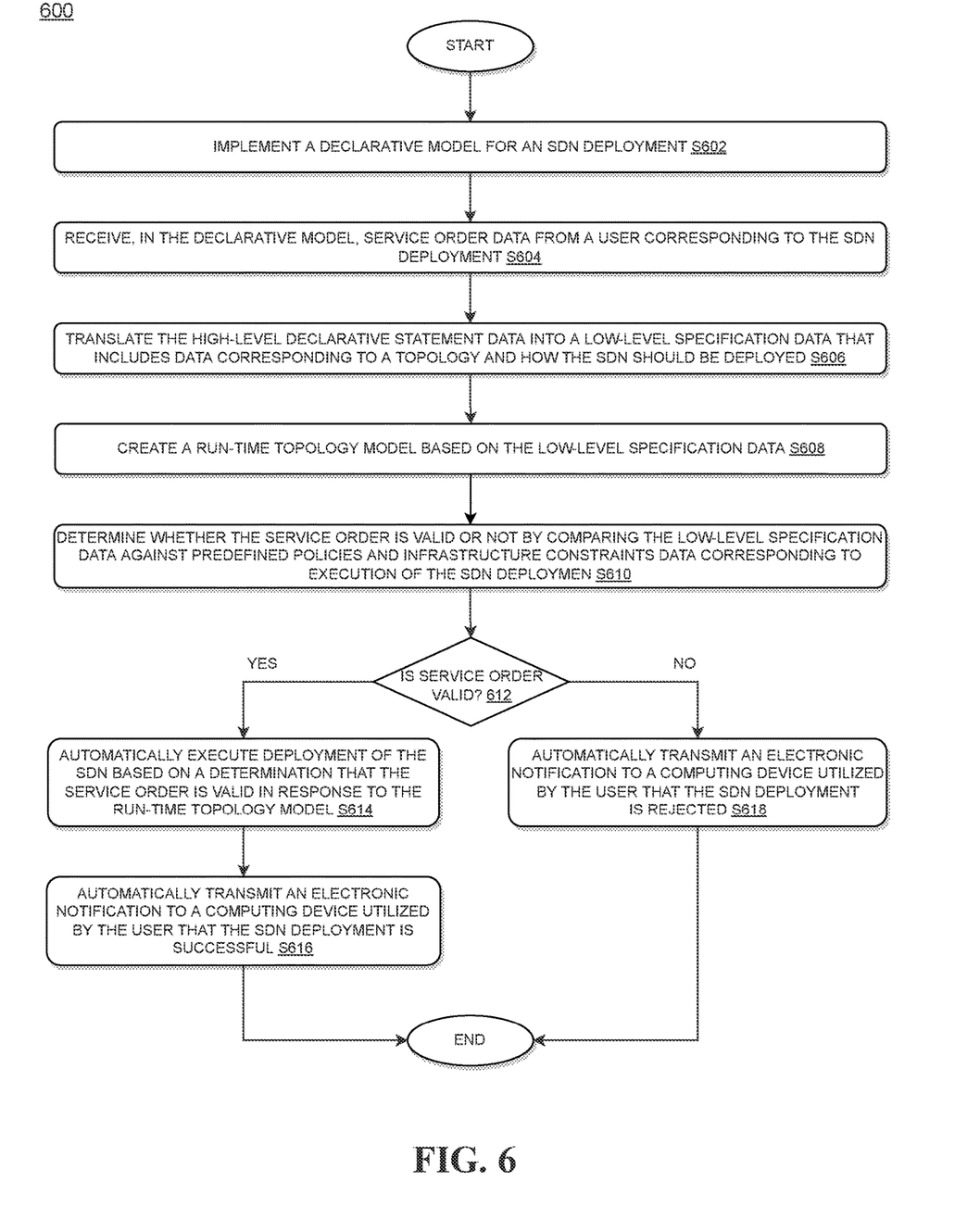
FIG. 6 illustrates an exemplary flow chart implemented by the platform and language agnostic intent-based declarative automation module of FIG. 4 in accordance with an exemplary embodiment.

FIG. 6 illustrates a flow chart of a process 600 for implementing the IBDAM 406 that provides a platform for automatically deploying an SDN in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include implementing a declarative model for an SDN deployment.

At step S604, the process 600 may include receiving, in the declarative model, service order data from a user corresponding to the SDN deployment, wherein the service order data includes high-level declarative statement data specifying a desired end-state of the SDN deployment.

At step S606, the process 600 may include translating the high-level declarative statement data into a low-level specification data that includes data corresponding to a topology and how the SDN should be deployed.

At step S608, the process 600 may include creating a run-time topology model based on the low-level specification data.

At step S610, the process 600 may include determining whether the service order is valid or not (step S612) by comparing the low-level specification data against predefined policies and infrastructure constraints data corresponding to execution of the SDN deployment.

When at step S612 it is determined that the service order is valid, at step S614, the process 600 may include automatically executing deployment of the SDN in response to the run-time topology model 409, 509.

At step S616, the process 600 may include automatically transmitting an electronic notification to the computing device (i.e., client device 408) utilized by the user that the SDN deployment is successful.

When at step S612 it is determined that the service order is not valid, at step S618, the process 600 may include automatically transmitting an electronic notification to the computing device (i.e., client device 408) utilized by the user that the SDN deployment is rejected.

According to exemplary embodiments, in determining whether the service order is valid or not, the process 600 may further include: generating a difference data based on comparing the low-level specification data against predefined policies and infrastructure constraints data; determining that the difference data is less than a predetermined threshold value; and determining that the service order is valid.

According to exemplary embodiments, in determining whether the service order is valid or not, the process 600 may further include: generating a difference data based on comparing the low-level specification data against predefined policies and infrastructure constraints data; determining that the difference data is equal to or more than a predetermined threshold value; and determining that the service order is invalid and triggers step 618 to automatically reject deployment of the SDN and to automatically transmit an electronic notification to the computing device (i.e., client device 408) utilized by the user that the SDN deployment is rejected.

According to exemplary embodiments, the IBDAD 402 may include a memory (e.g., a memory 106 as illustrated in FIG. 1) which may be a non-transitory computer readable medium that may be configured to store instructions for implementing the IBDAM 406 for automatically deploying an SDN as disclosed herein. The IBDAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the IBDAM 406, or within the IBDAD 402, may be used to perform one or more of the methods and processes as described herein. In a particular embodiment, the instructions may reside completely, or at least partially, within the memory 106, the medium reader 112, and/or the processor 104 (see FIG. 1) during execution by the IBDAD 402.

According to exemplary embodiments, the instructions, when executed, may cause a processor embedded within the IBDAM 406 or the IBDAD 402 to perform the following: implementing a declarative model 403 for an SDN deployment; receiving, in the declarative model, service order data from a user corresponding to the SDN deployment, wherein the service order data may include high-level declarative statement data specifying a desired end-state of the SDN deployment; translating the high-level declarative statement data into a low-level specification data that includes data corresponding to a topology and how the SDN should be deployed; creating a run-time topology model 409, 509 based on the low-level specification data; determining whether the service order is valid or not by comparing the low-level specification data against predefined policies and infrastructure constraints data corresponding to execution of the SDN deployment; and automatically executing deployment of the SDN based on a determination that the service order is valid in response to the run-time topology model. The processor may be the same or similar to the processor 104 as illustrated in FIG. 1 or the processor embedded within IBDAD 202, IBDAD 302, IBDAD 402, and the IBDAM 406.

According to exemplary embodiments, the instructions, when executed, may cause the processor 104 to further perform the following: automatically transmitting an electronic notification to a computing device utilized by the user that the SDN deployment is successful.

According to exemplary embodiments, in determining whether the service order is valid or not, the instructions, when executed, may cause the processor 104 to further perform the following: generating a difference data based on comparing the low-level specification data against predefined policies and infrastructure constraints data; determining that the difference data is less than a predetermined threshold value; and determining that the service order is valid.

According to exemplary embodiments, in determining whether the service order is valid or not, the instructions, when executed, may cause the processor 104 to further perform the following: generating a difference data based on comparing the low-level specification data against predefined policies and infrastructure constraints data; determining that the difference data is equal to or more than a predetermined threshold value; and determining that the service order is invalid.

According to exemplary embodiments, the instructions, when executed, may cause the processor 104 to further perform the following: automatically rejecting deployment of the SDN based on a determination that the service order is invalid; and automatically transmitting an electronic notification to a computing device utilized by the user that the SDN deployment is rejected.

According to exemplary embodiments as disclosed above in FIGS. 1-6, technical improvements effected by the instant disclosure may include a platform for implementing a platform and language agnostic intent-based declarative automation module for automatically deploying an SDN thereby significantly reducing infrastructure complexity and time in deployment and delivery of the SDN compared to conventional tools, but the disclosure is not limited thereto.

For example, according to exemplary embodiments as disclosed above in FIGS. 1-6, technical improvements effected by the instant disclosure may include a platform for implementing a platform and language agnostic intent-based declarative automation module that may be configured to view the deployment as the source of data and uses discovery to capture the current state of the deployment for validation purposes thereby integrating initial deployment and lifecycle management in a single solution platform, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically deploying a software-defined network (SDN) by utilizing one or more processors and one or more memories, the method comprising:
   implementing a platform and language agnostic intent-based declarative automation module that is configured to view deployment of the SDN as a source of data and implements discovery to capture current state of the deployment for validation purposes;
   integrating, in response to implementing platform and language agnostic intent-based declarative automation module, an initial deployment and a lifecycle management in a single solution platform, wherein the intent-based declarative automation module creates a declarative model in which a user specifies any desired end-state of the deployment in a high-level specification, and wherein the intent-based declarative automation module interprets and executes intent of the user in a manner consistent with defined business policies and infrastructure constraints:
   implementing the declarative model for the SDN deployment;
   receiving, in the declarative model, service order data from the user corresponding to the SDN deployment, wherein the service order data includes high-level declarative statement data specifying the desired end-state of the SDN deployment;
   translating the high-level declarative statement data into a low-level specification data that includes data corresponding to a topology and how the SDN should be deployed;
   creating a run-time topology model based on the low-level specification data;
   determining whether the service order is valid or not by comparing the low-level specification data against pre-defined policies and infrastructure constraints data corresponding to execution of the SDN deployment; and
   automatically executing deployment of the SDN based on a determination that the service order is valid in response to the run-time topology model,
   wherein in determining whether the service order is valid or not, the method further comprising:
   generating a difference data based on comparing the low-level specification data against predefined policies and infrastructure constraints data;
   determining that the difference data is less than a predetermined threshold value: and
   determining that the service order is valid.

2. The method according to claim 1, further comprising:
   automatically transmitting an electronic notification to a computing device utilized by the user that the SDN deployment is successful.

3. The method according to claim 1, wherein in determining whether the service order is valid or not the method further comprising:
   determining that the difference data is equal to or more than a predetermined threshold value; and
   determining that the service order is invalid.

4. The method according to claim 3, the method further comprising:
   automatically rejecting deployment of the SDN based on a determination that the service order is invalid; and automatically transmitting an electronic notification to a computing device utilized by the user that the SDN deployment is rejected.

5. The method according to claim 1, wherein the high-level declarative statement data does not include data related to details network configurations for services corresponding to the SDN deployment, and wherein the low-level specification data includes data related to details network configurations for services corresponding to the SDN deployment.

6. The method according to claim 1, wherein the service order data includes one or more of the following data: data related to a list of network subscribers; data related to a list of subnetworks assigned to each network subscriber; and data related to rules and constrains in sharing gateway for networking.

7. A system for automatically deploying a software-defined network (SDN), the system comprising:
a processor; and
a memory operatively connected to the processor via a communication interface, the memory storing computer readable instructions, when executed, causes the processor to:
implement a platform and language agnostic intent-based declarative automation module that is configured to view deployment of the SDN as a source of data and implements discovery to capture current state of the deployment for validation purposes;
integrate, in response to implementing platform and language agnostic intent-based declarative automation module, an initial deployment and a lifecycle management in a single solution platform, wherein the intent-based declarative automation module creates a declarative model in which a user specifies any desired end-state of the deployment in a high-level specification, and wherein the intent-based declarative automation module interprets and executes intent of the user in a manner consistent with defined business policies and infrastructure constraints;
implement the declarative model for the SDN deployment;
receive, in the declarative model, service order data from the user corresponding to the SDN deployment, wherein the service order data includes high-level declarative statement data specifying the desired end-state of the SDN deployment;
translate the high-level declarative statement data into a low-level specification data that includes data corresponding to a topology and how the SDN should be deployed;
create a run-time topology model based on the low-level specification data;
determine whether the service order is valid or not by comparing the low-level specification data against predefined policies and infrastructure constraints data corresponding to execution of the SDN deployment; and
automatically execute deployment of the SDN based on a determination that the service order is valid in response to the run-time topology model,
wherein in determining whether the service order is valid or not. the processor is further configured to:
generate a difference data based on comparing the low-level specification data against predefined policies and infrastructure constraints data;
determine that the difference data. is less than a predetermined threshold value; and
determine that the service order is valid.

8. The system according to claim 7, wherein the processor is further configured to:
automatically transmit an electronic notification to a computing device utilized by the user that the SDN deployment is successful.

9. The system according to claim 7, wherein in determining whether the service order is valid or not the processor is further configured to:
determine that the difference data is equal to or more than a predetermined threshold value; and
determine that the service order is invalid.

10. The system according to claim 9, wherein the processor is further configured to:
automatically reject deployment of the SDN based on a determination that the service order is invalid; and
automatically transmit an electronic notification to a computing device utilized by the user that the SDN deployment is rejected.

11. The system according to claim 7, wherein the high-level declarative statement data does not include data related to details network configurations for services corresponding to the SDN deployment, and wherein the low-level specification data includes data related to details network configurations for services corresponding to the SDN deployment.

12. The system according to claim 7. wherein the service order data includes one or more of the following data: data related to a list of network subscribers; data related to a list of subnetworks assigned to each network subscriber; and data related to rules and constrains in sharing gateway for networking.

13. A non-transitory computer readable medium configured to store instructions for automatically deploying a software-defined. network (SDN), wherein, when executed, the instructions cause a processor to perform the following:
implementing a platform and language agnostic intent-based declarative automation module that is configured to view deployment of the SDN as a source of data and implements discovery to capture current state of the deployment for validation purposes;
integrating, in response to implementing platform and language agnostic intent-based declarative automation module, an initial deployment and a lifecycle management in a single solution platform, wherein the intent-based declarative automation module creates a declarative model in which a user specifies any desired end-state of the deployment in a high-level specification, and wherein the intent-based declarative automation module interprets and executes intent of the user in a manner consistent with defined business policies and infrastructure constraints;
implementing the declarative model for the SDN deployment;
receiving, in the declarative model, service order data from the user corresponding to the SDN deployment, wherein the service order data includes high-level declarative statement data specifying the desired end-state of the SDN deployment;
translating the high-level declarative statement data into a low-level specification data. that includes data corresponding to a topology and how the SDN should be deployed;
creating a run-time topology model based on the low-level specification data;
determining whether the service order is valid or not by comparing the low-level specification data against predefined policies and infrastructure constraints data corresponding to execution of the SDN deployment; and automatically executing deployment of the SDN based on a determination that the service order is valid in response to the run-time topology model;

wherein in determining whether the service order is valid or not, the instructions, when executed, further cause the processor to perform the following:

generating a difference data based on comparing the low-level specification data against predefined policies and infrastructure constraints data;

determining that the difference data is less than a predetermined threshold value; and determining that the service order is valid.

14. The non-transitory computer readable medium according to claim 13. wherein, when executed, the instructions further cause the processor to perform the following:

automatically transmitting an electronic notification to a computing device utilized try the user that the SDN deployment is successful.

15. The non-transitory computer readable medium according to claim 13, wherein in determining whether the service order is valid or not, the instructions, when executed, further cause the processor to perform the following:

determining that the difference data is equal to or more than a predetermined threshold value; and determining that the service order is invalid.

16. The non-transitory computer readable medium according to claim 15. wherein the instructions, when executed, further cause the processor to perform the following:

automatically rejecting deployment of the SDN based on a determination that the service order is invalid; and automatically transmitting an electronic notification to a computing device utilized by the user that the SDN deployment is rejected.

17. The non-transitory computer readable medium according to claim 13, wherein the high-level declarative statement data does not include data related to details network configurations for services corresponding to the SDN deployment, and wherein the low-level specification data includes data related to details network configurations for services corresponding to the SDN deployment.

* * * * *